(12) United States Patent
Birukov et al.

(10) Patent No.: US 7,989,553 B2
(45) Date of Patent: Aug. 2, 2011

(54) EPOXY-AMINE COMPOSITION MODIFIED WITH HYDROXYALKYL URETHANE

(75) Inventors: Olga Birukov, Haifa (IL); Oleg Figovsky, Haifa (IL); Alexander Leykin, Haifa (IL); Leonid Shapovalov, Haifa (IL)

(73) Assignees: Nanotech Industries, Inc., Daly City, CA (US); Polymate, Ltd., Migdal Ha'emeq (IL)

( * ) Notice: Subject to any disclaimer, the term of this patent is extended or adjusted under 35 U.S.C. 154(b) by 61 days.

(21) Appl. No.: 12/383,589

(22) Filed: Mar. 26, 2009

(65) Prior Publication Data
US 2010/0249337 A1  Sep. 30, 2010

(51) Int. Cl.
*C08G 65/32* (2006.01)

(52) U.S. Cl. ........ 525/403; 525/408; 525/410; 525/461; 525/523; 528/403; 528/405; 528/408; 528/418; 528/421; 528/423

(58) Field of Classification Search .......... 525/157, 525/162, 163, 186, 399, 400, 438, 439, 440, 525/453, 523, 528, 403, 408, 410, 461; 528/403, 528/405, 408, 418, 421, 423
See application file for complete search history.

(56) References Cited

U.S. PATENT DOCUMENTS

| | | | | |
|---|---|---|---|---|
| 3,305,527 | A | * | 2/1967 | Price .................. 528/116 |
| 3,929,731 | A |   | 12/1975 | Volkova et al. |
| 3,945,972 | A | * | 3/1976 | Sakamoto ............ 525/507 |
| 4,484,994 | A |   | 11/1984 | Jacob, III et al. |
| 4,520,167 | A |   | 5/1985 | Blank et al. |
| 4,631,320 | A |   | 12/1986 | Parekh et al. |
| 4,758,632 | A |   | 7/1988 | Parekh et al. |
| 4,820,830 | A |   | 4/1989 | Blank et al. |
| 4,897,435 | A |   | 1/1990 | Jacob, III et al. |
| 4,931,157 | A | * | 6/1990 | Valko et al. .......... 204/505 |
| 5,134,205 | A | * | 7/1992 | Blank ................ 525/509 |
| 5,235,007 | A | * | 8/1993 | Alexander et al. ...... 525/523 |
| 5,565,531 | A |   | 10/1996 | Blank |
| 5,756,600 | A |   | 5/1998 | Okamura et al. |
| 7,232,877 | B2 |   | 6/2007 | Figovsky et al. |
| 7,288,595 | B2 | * | 10/2007 | Swarup et al. ......... 525/157 |

OTHER PUBLICATIONS

Oleg Figovsky and Leonid Shapovalov in article entitled "Cyclocarbonate-Based Polymers Including Non-Isocyanate Polyurethane Adhesives and Coatings", *Encyclopedia of Surface and Colloid Science*, Taylor & Francis., 2006: 6, pp. 1633-1652.

G. Rokicki and A. Piotrowska in *Polymer*, 2002, vol. 43, No. 10, pp. 2927-2935.

L. Ya. Rappoport, G. N. Petrov, I. I. Trostyanskaya and O. P. Gavrilova in *International Polymer Science and Technology*, 1981, vol. 8, No. 5, pp. T/68-T/70.

* cited by examiner

*Primary Examiner* — David Wu
*Assistant Examiner* — Robert Jones
(74) *Attorney, Agent, or Firm* — Haynes and Boone, LLP; Pavel I. Pogodin

(57) ABSTRACT

Disclosed is a novel epoxy-amine composition modified a hydroxyalkyl urethane, which is obtained as a result of a reaction between a primary amine ($C_1$) and a monocyclocarbonate ($C_2$), wherein modifier (C) is represented by the following formula (1):

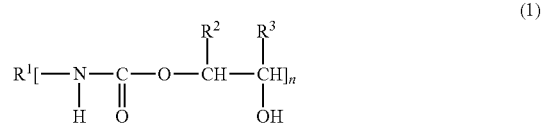

(1)

wherein $R^1$ is a residue of the primary amine, $R^2$ and $R^3$ are the same or different and are selected from the group consisting of H, alkyl, hydroxyalkyl, and n satisfies the following condition: $n \geq 2$. Diluents, pigments and additives can be used. Doping with the hydroxyalkyl-urethane modifier imparts to the cured composition superior coating performance characteristics, such as pot-life/drying, strength-stress, bonding, appearance, resistance to abrasion and solvents, etc., in a well-balanced state.

22 Claims, No Drawings

EPOXY-AMINE COMPOSITION MODIFIED WITH HYDROXYALKYL URETHANE

FIELD OF THE INVENTION

This invention relates to epoxy-amine compositions, in particular to epoxy-amine compositions modified with hydroxyalkyl urethane. The compositions of the invention can be used for forming adhesives, sealants, and coatings having high resistance to wear.

BACKGROUND OF THE INVENTION

It is known that three-dimensional epoxy-amine networks produced by curing epoxy compositions that contain a liquid epoxy resin and amino hardeners normally exhibit desirable properties. Therefore, amine-curable epoxy resin systems find wide application in the industry as coatings, adhesives, sealants, or matrices for components. Some applications require increase in the reaction rate which is normally achieved by adding accelerators. Various accelerators, such as phenol compounds, benzyl alcohol, carboxylic acids etc., are currently used by the industry to accelerate the curing process with commonly used amines and amine adducts. As these accelerators migrate from the cured epoxy polymer during the use, physical properties of that polymer are changed. The accelerators also act as plasticizers to the epoxy matrix and reduce the chemical resistance of the resulting cured epoxy polymer. A particular problem exists with the use of phenol as an accelerator, since it is highly corrosive to skin and is coming under an increasing regulatory pressure. Furthermore, the effect of phenol, nonyl phenol, benzyl alcohol and acids as accelerators are limited in their influence on a cure rate or physical and chemical properties of the resulting cured epoxy product.

Other currently used accelerators include tertiary amines such as trisdimethylaminomethylphenol (Ancamine K-54 by Air Products and Chemicals, Inc., PA, USA.), 1-2-aminoethyliperazine—(Accelerator 399 by Huntsman Corp., TX, USA), and acids such as salicylic acid, toluenesulfonic acid and boron trifluoride. Mercaptanes often are used for very rapid cure of epoxy formulations. However they are fugitive and can effect the environment.

Many accelerators are being developed in order to overcome these difficulties. However there is always a need for new accelerators and modifiers that could provide acceleration of curing of epoxy-amine compositions and in addition could modify the properties without significant adverse effects. The presence of active hydroxyl groups contained in hydroxyurethane compounds suggests an accelerating effect. The hydroxyurethane (another named hydroxylalkyl urethane or hydroxylalkyl carbamate) compounds are formed as a result of a reaction of cyclic carbonate with amine functionalities and well known in epoxy materials techniques.

Introduction of hydroxyurethane groups into a matrix of epoxy compound is described, for example, in the review "Cyclocarbonate Based Polymers Including Non-Isocyanate Polyurethane Adhesives and Coatings" by Oleg Figovsky and Leonid Shapovalov in *Encyclopedia of Surface and Colloid Science, Second Edition*; Taylor & Francis: New York, 2006; Vol. 3, pp. 1633-1652; and U.S. Pat. No. 7,232,877 issued to O. Figovsky, L. Shapovalov in 2007. In the above compounds, polyepoxy components, polyamine components and polycyclocarbonate components are combined by chemical bonds into common network. However, although such hybrid non-isocyanate polyurethane (HNIPU) materials have improved mechanical properties, they still possess certain shortcomings. More specifically, they demand preparation of special amine-cyclocarbonate adducts on the initial phase of processing. These reactive adducts are not stable due to an aminolysis reaction that increases viscosity during storage. Such a reaction is described in the article "A new route to polyurethanes from ethylene carbonate, diamine and diols" by G. Rokicki and A. Piotrowska in *Polymer*, 2002, Vol. 43, No. 10, pp. 2927-2935. Furthermore, alkylcyclocarbonates can be introduced only in limited quantities.

Numerous references exist showing the reactions of primary and secondary amines with monocyclocarbonates, e.g., propylene carbonates, to yield corresponding hydroxypropyl urethanes. For example, the article "Polyurethane elastomers obtained without the use of diisocyanates" by L. Ya. Rappoport, G. N. Petrov, I. I. Trostyanskaya and O. P. Gavrilova in *International Polymer Science and Technology*, 1981, Vol. 8, No. 5, pp. T/68-T/70. The Rappoport et al. paper discloses generally the reaction of cyclic carbonates with amines to form polyurethane elastomers. These materials are synthesized by two methods: the interaction of oligomers, containing some cyclocarbonate groups per molecule with low-molecular diamines and reactions of monomeric cyclocarbonates with low molecular diamines to obtain urethane-containing glycols used subsequently as the basic component for synthesizing polyurethane acetals by reacting with divinyl ethers of glycols. The last process is described in detail in U.S. Pat. No. 3,929,731 issued to Volkova, et al. in 1975.

U.S. Pat. No. 4,484,994 issued to Jacobs III, et al. in 1984 describes a hydroxyalkyl urethane-containing resin having at least one tertiary amine and at least two hydroxyalkyl urethane groups per molecule. The polymer is obtained by reacting an epoxy resin having an average epoxy equivalent weight from about 300 to about 10,000 with one or more amines having at least one secondary amine group and at least one hydroxyalkyl urethane group or a precursor thereof. The resulting polymer is too viscous and demands the use of organic solvents and increased temperatures.

U.S. Pat. No. 4,520,167 issued to Blank, et al. in 1985 discloses a coating composition comprises a hydroxyalkyl urethane compound, an amide-aldehyde cross-linker, a polymer containing active sites which are reactive with the cross-linker and, optionally, an acid catalyst. The hydroxyalkyl urethane compound serves as a reactive diluent in the composition. The composition is stable at ambient temperature and reactive only at elevated temperature to form a cross-linked compound in which the hydroxyalkyl urethane compound is chemically incorporated.

U.S. Pat. No. 4,631,320 issued to Parekh, et al. in 1986 relates to a thermostable coating composition that comprises a hydroxy group-containing polyurethane, polyurea, or polyurethane/polyurea polymer, an amino cross-linker, and, optionally, a catalyst and/or solvent. The polymer is obtained by self condensation of a hydroxyalkyl urethane compound or condensation of such a compound with a polyol and/or a polyamine. An applied coating of the composition is cured by heating to a predetermined temperature, e.g., from about 93° to about 204° C.

U.S. Pat. No. 4,758,632 issued to Parekh, et al. in 1988 describes a self-cross-linkable acrylic polymer that contains at least two hydroxyalkyl urethane groups per molecule and may comprise a reaction product of an acrylic backbone polymer containing one or more suitable reactive groups and an amine containing one primary or secondary amine group and at least one hydroxyalkyl urethane group or a precursor thereof. Alternatively, a self-cross-linkable polymer may be obtained by polymerization of an acrylic polymerizable monomer containing at least one hydroxyalkyl urethane group. A method of making the acrylic polymer, which is heat curable (≧122° C.) to provide thermosetting solvent-born coatings, comprises reacting a monomer or backbone polymer with an amine that contains hydroxyalkyl urethane groups or precursors thereof in the presence of a catalyst.

U.S. Pat. No. 4,820,830 issued to Blank, et al. in 1989 discloses a hydroxyalkyl urethane produced by reacting a cyclic carbonate with an alkylene diamine of the formula: $H_2N\text{-}(A\text{-})\text{-}NH_2$, wherein A is a cycloalkylene group or a branched chain alkylene moiety having from 4-18 carbon atoms, said moiety having attached thereto at least one alkyl group. Polymers of the resulting hydroxyalkyl urethanes are formed by reacting, e.g., with diols, polyols, or esters.

U.S. Pat. No. 4,897,435 issued to Jacobs III, et al. in 1990 relates to a hydrophilic, substantially epoxy-free self-cross-linkable polymer that contains hydroxyalkyl urethane groups and one or more tertiary amine groups. The polymer is made by reacting an epoxy resin having an average epoxy equivalent weight from about 100 to about 700 with one or more amines having at least one secondary amine group and at least one hydroxyalkyl urethane group or precursor thereof. A coating composition comprises an aqueous medium containing the polymer and, optionally, a cross-linking catalyst. A low temperature-curable coating is attained by utilization of the polymer with a suitable quaternary or ternary compound catalyst.

U.S. Pat. No. 5,134,205 issued to Blank in 1992 discloses certain polyamine hydroxyalkyl urethane monomers, polymers, and copolymers thereof and blends of the same with crosslinking film-making agents and films thereof deposited on substrates. Crosslinking agents are selected from the group consisting of a methylol polyamine and a polyisocyanate compound, or from the group consisting of a polyol, polycarboxylic acid, polycarboxylic acid ester, and polycarboxylic anhydride.

U.S. Pat. No. 5,565,531 issued to Blank in 1996 relates to improved acid etch resistant polymers and coatings, and their method of preparation. Polyurethane polyols that are used in this method have long alkyl side chains that include a single ether group. Therefore, when such polyurethane polyols react with melamine compounds, such as hexakismethoxymethylmelamine, they form coatings that have excellent solubility in hydrophobic solvents and provide films with excellent acid etch resistance.

U.S. Pat. No. 7,288,595, issued in 2007 to Swarup, et al. discloses a reaction product having polyether urethane groups formed from a polyoxyalkylene amine and a cyclic carbonate used in an equivalent ratio ranging from 1:0.5 to 1:1.5. Further provided is a process for preparing the aforementioned reaction product. The aforementioned invention also is aimed at obtaining an improved curable coating composition that includes a polymer that contains a reactive functional group and a curing agent having functional groups reactive with the functional groups of aforementioned polymer. The improvement consists of the introduction of the reaction product into the coating composition. Curing of the coating composition is carried out at an elevated temperature (121° C.).

U.S. Pat. No. 4,931,157 issued in 1990 to Joseph Valco, et al. teaches a product comprising an epoxy resin and a hydroxyalkyl-substituted urethane. Preferred polyepoxides are glycidyl ethers of polyphenols such as bisphenol A. Hydroxy-substituted urethanes are prepared by reacting a 1,2-polyol with a polyisocyanate. The reaction products have the following structural formula, wherein x preferably equals 1:

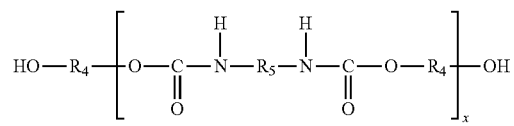

Polyamines such as ethylene diamine are included to incorporate cationic groups into the epoxy resin. Hydroxyalkyl-substituted urethanes are used as chain extenders for epoxy resins at the presence of catalysts and solvents at 100-145° C.

U.S. Pat. No. 3,305,527 issued in 1967 to Herbert Price teaches combining epoxide resins with 1,2-alkylene carbonates and primary amine curing agents such as ethylene diamine.

Thus, all known polymer compositions with hydroxyalkyl urethane monomers demand specific chemical reactions (such as transetherification, transamination, or self-cross-linking). These reactions are carried out at elevated temperatures, in the presence of organic solvents, and/or in water-dispersion media, sometimes in the presence of catalysts.

U.S. Pat. No. 5,235,007 issued in 1993 to David Alexander et al., teaches an epoxy resin compositions cured with mixtures of di-primary amines and carbamates, which are the reaction products of di-primary amines with alkylene glycol carbonates. The mixtures lead to faster curing, giving cured resins with improved properties, than may be observed after curing with di-primary amines alone. Preferred di-primary amines are ethylene amines, oxyalkylene amines, cycloaliphatic or araliphatic amines or alkylene diamines. Preferred carbonates are ethylene or propylene glycol carbonate.

OBJECTS AND SUMMARY OF THE INVENTION

An object of the present invention is to provide a novel epoxy-amine composition modified by introducing a hydroxyalkyl urethane into the composition without an additional chemical reaction.

It is another object to provide a method of manufacturing a novel epoxy-amine composition with the use of hydroxyalkyl modifier that accelerates curing and improves mechanical properties of the product without the need in additional chemical reactions.

The modifier used in the invention is a hydroxyalkyl urethane, i.e. a product of reaction of a primary amine and a monocyclic carbonate and is represented by the following formula (1):

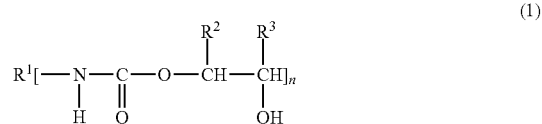

wherein $R^1$ is a residue of the primary amine,
$R^2$ and $R^3$ are the same or different and are selected from the group consisting of H, alkyl, hydroxyalkyl,
and n satisfies the following condition: $n \geq 2$.

The epoxy-amine composition modified with a hydroxyalkyl urethane comprises
an epoxy component (A),
an amine component (B), and the hydroxyalkyl urethane modifier (C), in accordance with formula (1).

Under conventional conditions (room temperature and atmospheric pressure), the hydroxyalkyl-urethane modifier (hereinafter referred to as HUM) does not react with epoxy resins.

A new method of modification of epoxy-amine compositions consist of introducing presynthesized HUM into an epoxy part of the epoxy-amine composition by mixing.

Introduction of HUM accelerates the curing reaction and at the same time improves wear resistance and mechanical properties without decreasing chemical resistance of the final cured polymer product.

DETAILED DESCRIPTION OF THE PREFERRED EMBODIMENTS

This invention relates to an epoxy-amine composition modified with a hydroxyalkyl urethane and comprising:
an epoxy component (A);
an amine component (B); and
a modifier (C) represented by formula (1), which is a product of reaction of a primary amine ($C_1$) with a monocyclic carbonate ($C_2$), wherein the chemical reaction is represented by the following formula (2):

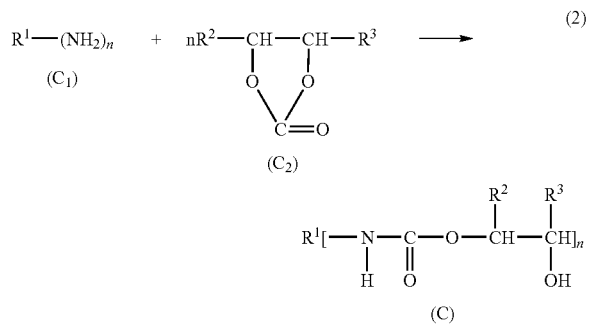

In this formula, $R^1$ is a residue of the primary amine,
$R^2$ and $R^3$ are the same or different and are selected from the group consisting of H, alkyl, hydroxyalkyl, and
n satisfies the following condition: $n \geq 2$.

The cured composition exhibits superior coating performance characteristics (pot-life/drying, strength-stress, bonding, appearance, resistance to abrasion and solvents, and the like) in a well-balanced state.

According to another aspect, the invention relates to the aforementioned hydroxyalkyl-urethane-modified epoxy-amine composition, wherein $R^1$ is selected from the group consisting of an alkyl, cycloalkyl, alkylaryl, and polyether of oxyalkylene.

According to one more aspect, the invention relates to the aforementioned hydroxyalkyl-urethane-modified epoxy-amine composition, wherein the primary amine ($C_1$) is selected from the group consisting of 2,2,4-(2,4,4)-trimethyl-1,6-hexanediamine, 1,6-hexanediamine, 2-methyl-1,5-pentanediamine, meta-xylylene diamine, isophorone diamine, cyclohexane diamine, 4,4'-diaminodicyclohexyl-methane, polyoxypropylene diamine, and polyoxypropylene triamine. There are some commercially available polyoxypropylene diamines and polyoxypropylene triamines that have the same structure, but different molecular weight, e.g., 200, 400, 2000, 5000 etc.

According to one more aspect, the invention relates to the aforementioned hydroxyalkyl urethane-modified epoxy-amine composition, wherein the monocyclic carbonate ($C_2$) has a 5-member structure, represents a 1,3-dioxolane ring, and is selected from the group consisting of cyclic ethylene carbonate, 1,2-propylene carbonate, 1,2-butylene carbonate, 2,3-butylene carbonate, 1,2-pentylene carbonate, and 1,2-glycerol carbonate.

According to one more aspect, the invention relates to the aforementioned hydroxylakyl urethane-modified epoxy-amine composition, wherein hydroxyalkyl urethane (C) is formed from primary polyamine ($C_1$) and monocyclic carbonate ($C_2$) in an equivalent weight ratio ranging from 1:1 to 1:1.1. The equivalent weight ratio is calculated as a ratio of the equivalent weight of the primary amine to the equivalent weight of the cyclic carbonate.

According to one more aspect, the invention relates to the aforementioned hydroxylakyl urethane-modified epoxy-amine composition, wherein said epoxy component (A) consists of at least one epoxy resin with at least two terminal glycidyl groups.

According to one more aspect, the invention relates to the hydroxylakyl urethane-modified epoxy-amine composition, wherein said epoxy component (A) is selected from the group consisting of a diglycidyl ether of bisphenol-A or bisphenol-F, hydrogenated diglycidyl ether of bisphenol-A, polyglycidyl ether of novolac resin or hydrohenated novolac resin with oxyrane functionality from 2.2 to 4, di- or polyglycidyl ether of an aliphatic polyol, di- or polyglycidyl ether of cycloaliphatic polyol, and combination thereof.

According to one more aspect, the invention relates to the hydroxylakyl urethane-modified epoxy-amine composition, wherein said epoxy component (A) selected from the group consisting of epoxy resins with at least two terminal glycidyl group and combination thereof additionally comprises a monofunctional reactive diluent selected from the group consisting of aliphatic glycidyl ether, aliphatic glycidyl ester, and aromatic glycidyl ether.

Although a singular form is used above, it should be noted that there exist different kinds of polyols and diglycidyl ethers with different molecular weight.

According to one more aspect, the invention relates to the hydroxylakyl urethane-modified epoxy-amine composition, wherein said amine component (B) is selected from the group consisting of an aliphatic amine, a cycloaliphatic amine, a polyoxyalkylene polyamine, an amine-epoxy adduct, an oxyalkylated amine, an amine-phenol adduct, and combinations thereof.

According to one more aspect, the invention relates to the hydroxylakyl urethane-modified epoxy-amine composition, wherein said amine component (B) is selected from the group consisting of 2,2,4-(2,4,4)-trimethyl-1,6-hexanediamine, 1,6-hexanediamine, 2-methyl-1,5-pentanediamine, meta-xylylene diamine, isophorone diamine, cyclohexane diamine, 4,4'-diaminodicyclohexyl-methane, polyoxypropylene diamine, polyoxypropylene triamine, and amine of the following formula

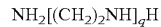

where q is digit from 1 to 5,
and combinations of the above compounds.

According to one more aspect, the invention relates to the aforementioned hydroxylakyl urethane-modified epoxy-amine composition, wherein said modifier (C) is introduced in an amount of 5-40%, preferable 10-20% of weight of the of the epoxy component (A).

According to one more aspect, the invention relates to the hydroxylakyl urethane-modified epoxy-amine composition, further combined with a compound selected from the group consisting of a diluents, pigments, additives, and combinations of the above compounds.

According to one more aspect, the invention relates to the hydroxyalkyl urethane-modified epoxy-amine composition, wherein molecular weight of the modifier is 300-6000 preferably 300-700.

The present invention also provides a method for manufacturing the epoxy-amine composition modified with a hydroxyalkyl urethane. The method consists of the following steps: obtaining a modifier (C) in the form of a hydroxyalkyl urethane by conducting a reaction between a primary amine ($C_1$) and a monocyclocarbonate ($C_2$); forming a composition that comprises an epoxy component (A), an amine component (B), and the aforementioned hydroxyalkyl urethane (C); and curing the composition for 7 days at a temperature in the range of 15° C. to 30° C.

The HUM can be synthesized from a cyclocarbonate and amine compound by known methods [see for example U.S. Pat. No. 4,820,830 issued to Blank, et al. in 1989 and U.S. Pat. No. 7,288,595, issued in 2007 to Swarup, et al.]. Properties of polymers modified with the HUM depend on nature of amine and cyclocarbonate used for HUM synthesis. The reaction is carried out at room temperature or an increased temperature (90-130° C.).

The HUM is compatible with standard epoxy resins, such as resins known under trademarks of DER-331 (DOW Chemical Company, MI, USA), Epicot-828 (Hexion Specialty Chemicals, TX, USA), Novolac epoxy resin DEN-431 (DOW Chemical Company, MI, USA), YDPN-631 (KUKDO Chemical Co., Korea), hydrogenated epoxy resins Eponex 1510 (Hexion Specialty Chemicals, TX, USA), Epalloy 5001 (CVC Specialty Chemicals, Inc., NJ, USA), ST-3000 (KUKDO Chemical Co., Korea), aliphatic and cycloaliphatic epoxy resins—Polypox R-11, Polypox R-14 (UPPC, Germany), etc.

The HUM accelerates the curing process and improves resistance of the cured product to wear without impairing chemical resistance. This effect provided by the use of the modifier of the invention is unobvious since the modifier is a low molecular weight compound that does not chemically react during the curing process. The modifier is not a part of the polymer network. In the method of the invention such an effect is applicable for improving properties of all types of epoxy-amine compositions.

The following commercially available components are used in the subsequent description.

Abbreviations and commercial names are given below.

| | |
|---|---|
| DGEBA | diglycidyl ether of Bisphenol A (liquid 100% epoxy resin) |
| AGE | aliphatic glycidyl ether |
| DER-331 | DER ® 331 (Dow Chemical Company, MI, USA), liquid 100% epoxy resin (DGEBA) |
| DER-324 | DER ® 324 (Dow Chemical Company, MI, USA), liquid 100% epoxy resin (83% DGEBA + 17% $C_{12\text{-}14}$ AGE) |
| ST-3000 | ST-3000 (KUKDO Chemical Co., Korea), hydrogenated DGEBA |
| DEN-431 | DEN ® 431 (Dow Chemical Company, MI, USA), liquid 100% epoxy-novolac resin |
| E-5001 | Epalloy 5001 (CVC Specialty Chemicals, Inc., NJ, USA), mixture of hydrogenated DGEBA and hydrogenated epoxy-novolac resin |
| R11 | Polypox ® R11 (UPPC GmbH, Germany), diglycidyl ether of cyclohexanedimethanol |
| R14 | Polypox ® R14 (UPPC GmbH, Germany), diglycidyl ether of neopentyl glycol |
| PC | Jeffsol ® PC (Huntsman Corp., TX, USA), propylene carbonate |
| IPDA | Isophoronediamine (BASF, Germany) |
| TMD | Vestamin ® TMD - 2,2,4-(2,4,4)-trimethyl-1,6-hexanediamine (Evonik Industries, Germany) |
| D400 | Jeffamine ® D400 - polyoxypropylene diamine (Huntsman Corp., TX, USA) |
| T403 | Jeffamine ® T403 - polyoxypropylene triamine (Huntsman Corp., TX, USA) |
| MXDA | meta-xylylenediamine |
| BA | benzyl alcohol |
| TETA | triethylenetetramine |
| A-1769 | Ancamine ® 1769 - mixture of TETA and polyoxypropylated TETA (Air Products, Inc., PA, USA) |
| A-2379 | Ancamine ® 2379 - mixture of IPDA and BA (Air Products, Inc., PA, USA) |
| A-2432 | Ancamine ® 2432 - mixture of MXDA and BA (Air Products, Inc., PA, USA) |
| EEW | Epoxy equivalente weight |
| AEW | Primary amine equivalente weight |
| AHEW | Amine hydrogen equivalente weight |
| CCEW | Cyclic carbonate equivalente weight |

EXAMPLES

Synthesis of Hydroxyalkyl Urethane Modifier HUM-1

15.8 g (0.2 AEW) of TMD and 20.4 g (0.2 CCEW) of PC, ratio 1:1, were put into a 100 ml flask and then the mixture was stirred. The reaction mixture was kept in the flask at room temperature during 6 hours and the consumption of the cyclic carbonate groups was controlled by spectrometer FT/IR, (wavelength 1800 $cm^{-1}$).

Calculated molecular mass of HUM-1 was 362.
Solids content (60°, 110° C.) was 97%.
Viscosity (25° C.) was 79 Pa·s.

Synthesis of Hydroxyalkyl Urethane Modifier HUM-2

17.0 g (0.2 AEW) of IPDA and 22.4 g (0.22 CCEW) of PC, ratio 1:1.1, were loaded into a 100 ml flask, and then the mixture was stirred. The reaction mixture was kept in the flask at room temperature during 6 hours, and the consumption of the cyclic carbonate groups was controlled by spectrometer FT/IR, (wavelength 1800 $cm^{-1}$).

Calculated molecular mass of HUM-2 was 374.
Solids content (60°, 110° C.) was 96%.
Viscosity (50° C.) was 27 Pa·s.

Synthesis of Hydroxyalkyl Urethane Modifier HUM-3

43.0 g (0.2 AEW) of D400 and 20.4 g (0.2 CCEW) of PC, ratio 1:1, were placed into a 100 ml flask, and then the mixture was stirred. The reaction mixture was heated to 120° C. (20 hours). The reaction mixture was held at this temperature, and the consumption of the cyclocarbonate groups was controlled by spectrometer FT/IR, (wavelength 1800 $cm^{-1}$). MW of Calculated molecular mass of HUM-3 was 634.

Solids content (60°, 110° C.) was 98%.
Viscosity (25° C.) was 8 Pa·s.

Synthesis of Hydroxyalkyl Urethane Modifier HUM-4

32.4 g (0.2 AEW) of T403 and 22.4 g (0.22 CCEW) of PC, ratio 1:1.1, were placed into a 100 ml flask, and then the mixture was stirred. The reaction mixture was heated to 120° C. (20 hours). The reaction mixture was held at this temperature, and the consumption of the cyclocarbonate groups was controlled by spectrometer FT/IR, (wavelength 1800 cm$^{-1}$). MW of Calculated molecular mass of HUM-3 was 634.
Solids content (60°, 110° C.) was 96%.
Viscosity (25° C.) was 53 Pa·s.

COMPARATIVE EXAMPLES

Comparative Composition 1

18.7 g (0.1 EEW) of DER-331
4.0 g (0.1 AHEW) of TMD
The mixture was placed into a 50 ml vessel and was stirred for 2 minutes.
Then the mixture was poured into standard moulds and was held at a temperature in the range of 15° C. to 30° C. for 7 days.

Comparative Composition 2

22.5 g (0.1 EEW) ST-3000
4.0 g (0.1 AHEW) TMD
The mixture was put into a 50 ml vessel and was stirred for 2 minutes.
Then the mixture was poured into standard moulds and was held at a temperature in the range of 15° C. to 30° C. for 7 days.

Example 1

Composition 1

18.7 g (0.1 EEW) of DER-331
0.9 g (5% to epoxy resin) HUM-1
The mixture was put into a 50 ml vessel, was stirred and heated at 50° C. for 30 min.
Then the mixture was cooled to RT, 4.0 g (0.1 AHEW) of TMD was added, and the mixture was repeatedly stirred for 2 minutes.
Then the mixture was poured into standard moulds.

Composition 2

18.7 g (0.1 EEW) of DER-331
1.9 g (10% to epoxy resin) HUM-1
The mixture was placed into a 50 ml vessel, was stirred and heated at 50° C. for 30 min. Then the mixture was cooled to RT, 4.0 g (0.1 AHEW) of TMD was added, and the mixture was repeatedly stirred for 2 minutes.
Then the mixture was loaded into standard moulds.

Composition 3

18.7 g (0.1 EEW) of DER-331
2.8 g (15% to epoxy resin) HUM-1
The mixture was placed into a 50 ml vessel, and stirred and heated at 50° C. for 30 min.
Then the mixture was cooled to RT, 4.0 g (0.1 AHEW) of TMD was added, and the mixture was repeatedly stirred for 2 minutes.
Then the mixture was loaded into standard moulds.

Composition 4

18.7 g (0.1 EEW) DER-331
3.7 g (20% to epoxy resin) HUM-1
The mixture was put into a 50 ml vessel and was stirred and heated at 50° C. for 30 min.
Then the mixture was cooled to RT, 4.0 g (0.1 AHEW) of TMD was added, and the mixture was repeatedly stirred for 2 minutes.
Then the mixture was loaded into standard moulds.

Composition 5

18.7 g (0.1 EEW) DER-331
4.7 g (25% to epoxy resin) HUM-1
The mixture was placed into a 50 ml vessel, stirred and heated at 50° C. for 30 min.
Then the mixture was cooled to RT and 4.0 g (0.1 AHEW) of TMD was added, and the mixture was repeatedly stirred for 2 minutes.
Then the mixture was loaded into standard moulds.
The reaction mixtures of compositions according EXAMPLE 1 were held at a temperature in the range of 15° C. to 30° C. for 7 days.
Testing of the Polymers
The polymerized samples were tested with regard to the following mechanical and chemical properties:
Pot Life (2× viscosity) (in accordance with ASTM D1084)
Tensile strength (in accordance with ASTM D638M)
Ultimate Elongation (in accordance with ASTM D638M)
Hardness (Shore D) (in accordance with ASTM D2240)
Wear resistance (loss of mass, mg/1000 cycles, load 1000 g, wheel CS-17) (in accordance with ASTM D4080)
Weight gain at immersion in water (24 h @ 25° C.) (in accordance with ASTM D570)
Weight gain at immersion in 20% $H_2SO_4$ (24 h @ 25° C.) (in accordance with ASTM D543)
The results of the tests are summarized in Table 1 given below.

TABLE 1

Properties Data of compositions DER-331, TMD and HUM-1.

| Technical Data | Comparative Composition 1 | Compositions of Present Invention | | | | |
| --- | --- | --- | --- | --- | --- | --- |
| | | 1 | 2 | 3 | 4 | 5 |
| HUM-1, % | 0 | 5 | 10 | 15 | 20 | 25 |
| Pot life, min | 90 | 60 | 44 | 38 | 27 | 25 |
| Hardness, Shore D | 78 | 82 | 83 | 83 | 85 | 84 |
| Tensile strength, kg/mm$^2$ | 4.4 | 5.0 | 5.0 | 4.9 | 5.8 | 5.0 |
| Elongation at break, % | 1.8 | 2.4 | 2.2 | 2.1 | 2.4 | 3 |
| Wear resistance, loss of mass mg/1000 cycles | 57 | 35 | 25 | 24 | 22 | 22 |
| Weight gain at immersion in water (24 h @ 25° C.), % | 0.2 | 0.2 | 0.2 | 0.2 | 0.2 | 0.2 |

TABLE 1-continued

Properties Data of compositions DER-331, TMD and HUM-1.

| Technical Data | Comparative Composition 1 | Compositions of Present Invention | | | | |
|---|---|---|---|---|---|---|
| | | 1 | 2 | 3 | 4 | 5 |
| Weight gain at immersion in 20% $H_2SO_4$ (24 h @ 25° C.), % | 0.2 | 0.2 | 0.2 | 0.3 | 0.3 | 0.3 |

Example 2

Preparation of Epoxy-Amine Composition—ST-3000, TMD, HUM-2

Comparative Composition 2 was used in this EXAMPLE.
The mixture was put into a 50 ml vessel and was stirred for 2 minutes.
Then the mixture was poured into standard moulds.

Composition 6

22.5 g (0.1 EEW) ST-3000
1.1 g (5.0% to epoxy resin) HUM-2
The mixture was put into a 50 ml vessel, was stirred and heated at 50° C. during 30 min
Then the mixture was cooled to RT, 4.0 g (0.1 AHEW) of TMD was added, and the mixture was repeatedly stirred for 2 minutes.
Then the mixture was applied to standard moulds.

Composition 7

22.5 g (0.1 EEW) ST-3000
2.2 g (10% to epoxy resin) HUM-2
The mixture was put into a 50 ml vessel, was stirred and heated at 50° C. during 30 min.
Then the mixture was cooled to RT, 4.0 g (0.1 AHEW) of TMD was added, and the mixture was repeatedly stirred for 2 minutes.
Then the mixture was placed into standard moulds.

Composition 8

22.5 g (0.1 EEW) ST-3000
3.4 g (15% to epoxy resin) HUM-2
The mixture was put into a 50 ml vessel, was stirred and heated at 50° C. during 30 min.
Then the mixture was cooled to RT and 4.0 g (0.1 AHEW) of TMD, and the mixture was repeatedly stirred for 2 minutes.
Then the mixture was placed into standard moulds.

Composition 9

22.5 g (0.1 EEW) ST-3000
4.5 g (20% to epoxy resin) HUM-2
The mixture was put into a 50 ml vessel, was stirred and heated at 50° C. during 30 min.
Then the mixture was cooled to RT, 4.0 g (0.1 AHEW) of TMD was added, and the mixture was repeatedly stirred for 2 minutes.
Then the mixture was placed into standard moulds.

Composition 10

22.5 g (0.1 EEW) ST-3000
6.8 g (30% to epoxy resin) HUM-2
The mixture was put into a 50 ml vessel, was stirred and heated at 50° C. during 30 min.
Then the mixture was cooled to RT, 4.0 g (0.1 AHEW) of TMD was added, and the mixture was repeatedly stirred for 2 minutes.
Then the mixture was placed into standard moulds.
Process of cure of the compositions was shown above in EXAMPLE 1.
Testing of the polymers was described in EXAMPLE 1.
Results of testing of polymers according EXAMPLE 2 are shown in Table 2.

TABLE 2

Properties Data of compositions ST-3000, TMD and HUM-2.

| Technical Data | Comparative Composition 2 | Compositions of Present Invention | | | | |
|---|---|---|---|---|---|---|
| | | 6 | 7 | 8 | 9 | 10 |
| HUM-2, % | 0 | 5 | 10 | 15 | 20 | 30 |
| Pot life, min | 240 | 165 | 120 | 90 | 60 | 40 |
| Dry to touch, h | 8 | 5.5 | 4.5 | 4 | 3.5 | 3 |
| Hardness, Shore D | 80 | 81 | 81 | 81 | 82 | 78 |
| Tensile strength, $kg/mm^2$ | 5.5 | 4.5 | 4.5 | 4.9 | 4.8 | 4.7 |
| Wear resistance, loss of mass mg/1000 cycles | 58 | 52 | 46 | 42 | 41 | 31 |
| Weight gain at immersion in water (24 h @ 25° C.), % | 0.2 | 0.2 | 0.3 | 0.3 | 0.3 | 0.4 |
| Weight gain at immersion in 20% $H_2SO_4$, (24 h @ 25° C.), % | 1.2 | 1.1 | 1.2 | 1.2 | 1.2 | 1.9 |

Example 3

Preparation of epoxy-amine compositions DER-331, TMD, HUM-3

Comparative Composition 1 was used in this EXAMPLE.
The mixture was placed into a 50 ml vessel and was stirred for 2 min.
Then the mixture was loaded into standard moulds.

Composition 11

18.7 g (0.1 EEW) DER-331
1.9 g (10% to epoxy resin) HUM-3
The mixture was placed into a 50 ml vessel, stirred and heated at 50° C. for 30 min.
Then the mixture was cooled to RT; 4.0 g (0.1 AHEW) of TMD was added, and the mixture was repeatedly stirred for 2 minutes. Then the mixture was loaded into standard moulds.

Composition 12

18.7 g (0.1 EEW) DER-331
3.7 g (20% to epoxy resin) HUM-3
The mixture was placed into a 50 ml vessel, then stirred, and heated at 50° C. for 30 mm.
Then the mixture was cooled to RT, 4.0 g (0.1 AHEW) of TMD was added, and the mixture was repeatedly stirred for 2 minutes.
Then the mixture was applied to standard moulds.

Composition 13

18.7 g (0.1 EEW) DER-331
5.6 g (30% to epoxy resin) HUM-3
The mixture was placed into a 50 ml vessel, stirred, and heated at 50° C. for 30 min.
Then the mixture was cooled to RT, 4.0 g (0.1 AHEW) of TMD was added, and the mixture was repeatedly stirred for 2 min.
Then the mixture was loaded into standard moulds.

Composition 14

18.7 g (0.1 EEW) DER-331
7.5 g (40% to epoxy resin) HUM-3
The mixture was placed into a 50 ml vessel, stirred, and heated at 50° C. for 30 min.
Then the mixture was cooled to RT, 4.0 g (0.1 AHEW) of TMD was added, and the mixture was repeatedly stirred for 2 min.
Then the mixture was loaded into standard moulds.
Process of cure of the compositions was shown above in EXAMPLE 1.
Testing of the polymers was described in EXAMPLE 1.
Results of testing of polymers according EXAMPLE 3 are shown in Table 3.

TABLE 3

Properties Data of compositions DER-331, TMD and HUM-3.

| Technical Data | Comparative Composition 1 | Compositions of the Invention | | | |
|---|---|---|---|---|---|
| | | 11 | 12 | 13 | 14 |
| HUM-3, % | 0 | 10 | 20 | 30 | 40 |
| Pot life, min | 90 | 85 | 75 | 70 | 65 |
| Hardness, Shore D | 78 | 82 | 82 | 82 | 81 |
| Tensile strength, kg/mm$^2$ | 4.4 | 6.2 | 6.2 | 6.8 | 5.7 |
| Elongation at break, % | 1.8 | 2.9 | 2.8 | 4 | 6.2 |
| Wear resistance, loss of mass mg/1000 cycles | 57 | 56 | 48 | 48 | 48 |
| Weight gain at immersion in water (24 h @ 25° C.), % | 0.2 | 0.4 | 0.3 | 0.4 | 0.5 |
| Weight gain at immersion in 20% H$_2$SO$_4$ (24 h @ 25° C.), % | 0.2 | 0.4 | 0.7 | 0.8 | 1.2 |

Example 4

Preparation of epoxy-amine composition DER-324, A-2432, HUM-2, HUM-3

20.0 g (0.1 EEW) DER-324
2.0 g (10% to epoxy resin) HUM-2
2.0 g (10% to epoxy resin) HUM-3
The mixture was placed into a 50 ml vessel, stirred and heated at 50° C. for 30 min.
Then the mixture was cooled to RT; 8.8 g (0.1 AHEW) of A-2432 was added, and the mixture was repeatedly stirred for 2 minutes. Then the mixture was loaded into standard moulds and was held at a temperature in the range of 15° C. to 30° C. for 7 days.

Example 5

Preparation of epoxy-amine composition DEN431, R-14, A-1769, HUM-1

14.0 g (0.08 EEW) DEN-431
3.0 g (0.02 EEW) R-14
2.6 g (15% to epoxy resins) HUM-1
The mixture was placed into a 50 ml vessel, stirred and heated at 50° C. for 30 min.
Then the mixture was cooled to RT; 4.8 g (0.1 AHEW) of A-1769 was added, and the mixture was repeatedly stirred for 2 minutes. Then the mixture was loaded into standard moulds and was held at a temperature in the range of 15° C. to 30° C. for 7 days.

Example 6

Preparation of epoxy-amine composition E-5001, R-11, A-2379, HUM-4

16.0 g (0.08 EEW) E-5001
3.5 g (0.02 EEW) R-11
2.0 g (10% to epoxy resins) HUM-4
The mixture was placed into a 50 ml vessel, stirred and heated at 50° C. for 30 min.
Then the mixture was cooled to RT; 8.6 g (0.1 AHEW) of A-2379 was added, and the mixture was repeatedly stirred for 2 minutes. Then the mixture was loaded into standard moulds and was held at a temperature in the range of 15° C. to 30° C. for 7 days.
Testing of the polymers according EXAMPLES 4, 5 and 6 was described in EXAMPLE 1.
Results of testing of polymers according EXAMPLES 4, 5 and 6 are shown in Table 4.

TABLE 4

Properties Data of compositions by Examples 4-6

| Technical Data | Example | | |
|---|---|---|---|
| | 4 | 5 | 6 |
| Sum of HUM, % | 20 | 15 | 10 |
| Pot life, min | 23 | 28 | 21 |
| Dry to touch, h | 3 | 4 | 4.5 |
| Hardness, Shore D | 81 | 84 | 80 |
| Tensile strength, kg/mm$^2$ | 4.2 | 5.0 | 5.7 |
| Elongation at break, % | 4.5 | 3.9 | 4.3 |
| Wear resistance, loss of mass mg/1000 cycles | 26 | 32 | 28 |
| Weight gain at immersion in water (24 h @ 25° C.), % | 0.3 | 0.2 | 0.3 |
| Weight gain at immersion in 20% H$_2$SO$_4$ (24 h @ 25° C.), % | 0.2 | 0.2 | 1.2 |

Examples 1 through 7 clearly show that the epoxy-amine compositions modified with a hydroxyalkyl urethane of the present invention have improved curing characteristics and provide cured products with better wear resistance, flexibility, well-balanced mechanical properties, and chemical resistance than conventional Comparative Compositions 1 and 2.

Although the epoxy-amine compositions modified with hydroxyalkyl urethane of this invention have been described with reference to specific examples, other variations and changes are possible without departing from the scope of the patent claims.

What is claimed is:

1. An epoxy-amine composition modified with a hydroxyalkyl urethane and comprising:
an epoxy component (A);
an amine component (B); and
a modifier (C) that comprises said hydroxyalkyl urethane obtained as a result of a reaction between a primary amine ($C_1$) and a monocyclocarbonate ($C_2$), wherein modifier (C) is represented by the following formula (1):

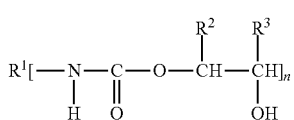

wherein $R^1$ is a residue of the primary amine,
$R^2$ and $R^3$ are the same or different and are selected from the group consisting of H, alkyl, hydroxyalkyl, and n satisfies the following condition: $n \geq 2$.

2. The composition as claimed in claim 1, wherein $R^1$ is selected from the group consisting of an alkyl, cycloalkyl, alkylaryl, polyether or oxyalkylene.

3. The composition as claimed in claim 1, wherein the primary amine ($C_1$) is selected from the group consisting of 2,2,4-(2,4,4)-trimethyl-1,6-hexanediamine, 1,6-hexanediamine, 2-methyl-1,5-pentanediamine, meta-xylylene diamine, isophorone diamine, cyclohexane diamine, 4,4'-diaminodicyclohexyl-methane, polyoxypropylene diamines and polyoxypropylene triamines.

4. The composition as claimed in claim 1, wherein the monocyclocarbonate ($C_2$) has a 5-member structure, represents a 1,3-dioxolane ring, and is selected from the group consisting of ethylene carbonate, 1,2-propylene carbonate, 1,2-butylene carbonate, 2,3-butylene carbonate, 1,2-pentylene carbonate, and 1,2-glycerol carbonate.

5. The composition as claimed in claim 3, wherein the monocyclocarbonate ($C_2$) has a 5-member structure, represents a 1,3-dioxolane ring, and is selected from the group consisting of ethylene carbonate, 1,2-propylene carbonate, 1,2-butylene carbonate, 2,3-butylene carbonate, 1,2-pentylene carbonate and 1,2-glycerol carbonate.

6. The composition as claimed in claim 1, wherein modifier (C) is characterized by formed from primary polyamine ($C_1$) and monocyclic carbonate ($C_2$) in an equivalent weight ratio ranging from 1:1 to 1:1.1.

7. The composition as claimed in claim 5, wherein modifier (C) is formed from primary polyamine ($C_1$) and monocyclic carbonate ($C_2$) in an equivalent weight ratio ranging from 1:1 to 1:1.1.

8. The composition as claimed in claim 1, wherein said epoxy component (A) consists of at least one epoxy resin with at least two terminal glycidyl groups.

9. The composition as claimed in claim 7, wherein said epoxy component (A) consists of at least one epoxy resin with at least two terminal glycidyl groups.

10. The composition as claimed in claim 8, wherein said epoxy component (A) is selected from the group consisting of diglycidyl ethers of bisphenol-A or bisphenol-F, hydrogenated diglycidyl ether of bisphenol-A, polyglycidyl ethers of novolac resin or hydrohenated novolac resin with oxyrane functionality from 2.2 to 4, di- or polyglycidyl ethers of aliphatic polyols, di- or polyglycidyl ethers of cycloaliphatic polyols, and combinations thereof.

11. The composition as claimed in claim 9, wherein said epoxy component (A) is selected from the group consisting of diglycidyl ethers of bisphenol-A or bisphenol-F, hydrogenated diglycidyl ether of bisphenol-A, polyglycidyl ethers of novolac resin or hydrohenated novolac resin with oxyrane functionality from 2.2 to 4, di- or polyglycidyl ethers of aliphatic polyols, di- or polyglycidyl ethers of cycloaliphatic polyols and combinations thereof.

12. The composition as claimed in claim 8, wherein said epoxy component (A) with at least two terminal glycidyl groups additionally comprises monofunctional reactive diluents selected from the group consisting of aliphatic glycidyl ethers, aliphatic glycidyl esters, and aromatic glycidyl ethers.

13. The composition as claimed in claim 11, wherein said epoxy component (A) with at least two terminal glycidyl groups additionally comprises monofunctional reactive diluents selected from the group consisting of aliphatic glycidyl ethers, aliphatic glycidyl esters, and aromatic glycidyl ethers.

14. The composition as claimed in claim 1, wherein said amine component (B) is selected from the group consisting of an aliphatic amine, a cycloaliphatic amine, a polyoxyalkylene polyamine, an amine-epoxy adduct, an oxyalkylated amine, an amine-phenol adduct, and combinations thereof.

15. The composition as claimed in claim 1, wherein said amine component (B) is selected from the group consisting of 2,2,4-(2,4,4)-trimethyl-1,6-hexanediamine, 1,6-hexanediamine, 2-methyl-1,5-pentanediamine, meta-xylylene diamine, isophorone diamine, cyclohexane diamine, 4,4'-diaminodicyclohexyl-methane, polyoxypropylene diamines, polyoxypropylene triamines, and amines represented by the formula $$NH_2[(CH_2)_2NH]_qH$$

(where q is an integer from 1 to 5),
and combinations thereof.

16. The composition as claimed in claim 13, wherein said amine component (B) is selected from the group consisting of 2,2,4-(2,4,4)-trimethyl-1,6-hexanediamine, 1,6-hexanediamine, 2-methyl-1,5-pentanediamine, meta-xylylene diamine, isophorone diamine, cyclohexane diamine, 4,4'-diaminodicyclohexyl-methane, polyoxypropylene diamines, polyoxypropylene triamines and amines represented by the formula $$NH_2[(CH_2)_2NH]_qH$$

(where q is an integer from 1 to 5),
and combinations thereof.

17. The composition as claimed in claim 1, wherein said modifier (C) is introduced in an amount of 5-40% of weight of the of the epoxy component (A).

18. The composition as claimed in claim 1, wherein said modifier (C) is introduced in an amount of 10-20% of weight of the of the epoxy component (A).

19. The composition as claimed in claim 1, further combined with a conventional compound selected from the group consisting of a diluent, a pigment, and an additive.

20. The composition as claimed in claim 1, wherein molecular weight of the modifier (C) ranges from 300 to 6000.

21. The composition as claimed in claim 1, wherein molecular weight of the modifier (C) ranges from 300 to 700.

22. A method for manufacturing an epoxy-amine composition modified with a hydroxyalkyl urethane, the method comprising the following steps: obtaining a modifier (C) in the form of a hydroxyalkyl urethane by conducting a reaction between a primary amine ($C_1$) and a monocyclocarbonate ($C_2$) used in an equivalent weight ratio ranging from 1:1 to 1:1.1; forming a composition that comprises an epoxy component (A), an amine component (B), and the aforementioned hydroxyalkyl urethane (C); and curing the composition for 7 days at a temperature in the range of 15° C. to 30° C., thus obtaining an epoxy-amine composition modified with a hydroxyalkyl urethane, wherein modifier (C) is represented by the following formula (I):

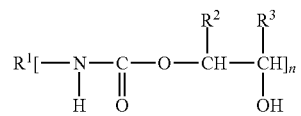
(1)

where $R^1$ is a residue of the primary amine, $R^2$ and $R^3$ are the same or different and are selected from the group consisting of H, alkyl, hydroxyalkyl, and n satisfies the following condition: $n \geq 2$.

* * * * *